(12) United States Patent
Pennings

(10) Patent No.: US 12,241,970 B1
(45) Date of Patent: Mar. 4, 2025

(54) 3D SCENE RECONSTRUCTION USING MULTI-STATIC CLUSTER RECEIVERS

(71) Applicant: R2 Space, LLC, Ann Arbor, MI (US)

(72) Inventor: Jeffrey Scott Pennings, Ann Arbor, MI (US)

(73) Assignee: R2 SPACE, LLC, Ann Arbor, MI (US)

( * ) Notice: Subject to any disclaimer, the term of this patent is extended or adjusted under 35 U.S.C. 154(b) by 675 days.

(21) Appl. No.: 17/392,856

(22) Filed: Aug. 3, 2021

Related U.S. Application Data

(60) Provisional application No. 63/165,631, filed on Mar. 24, 2021, provisional application No. 63/061,025, filed on Aug. 4, 2020.

(51) Int. Cl.
| | | |
|---|---|---|
| *G01S 13/90* | (2006.01) | |
| *G05D 1/00* | (2024.01) | |
| *G06T 1/20* | (2006.01) | |
| *H04B 7/185* | (2006.01) | |
| *H04B 7/195* | (2006.01) | |

(52) U.S. Cl.
CPC ........ *G01S 13/9021* (2019.05); *G05D 1/0094* (2013.01); *G05D 1/10* (2013.01); *G06T 1/20* (2013.01); *H04B 7/1851* (2013.01); *H04B 7/195* (2013.01)

(58) Field of Classification Search
None
See application file for complete search history.

(56) References Cited

U.S. PATENT DOCUMENTS

| | | | | |
|---|---|---|---|---|
| 11,188,750 | B1* | 11/2021 | Ma | G06V 10/30 |
| 2015/0204974 | A1* | 7/2015 | Pillay | G01S 13/86 |
| | | | | 342/25 A |
| 2016/0306824 | A1* | 10/2016 | Lopez | G06F 16/738 |
| 2021/0036767 | A1* | 2/2021 | Devaraj | H04B 7/195 |

FOREIGN PATENT DOCUMENTS

WO     WO-2018231515 A1 * 12/2018     ......... G01S 13/003

* cited by examiner

*Primary Examiner* — Vladimir Magloire
*Assistant Examiner* — David C. Schultz

(57) ABSTRACT

Various embodiments of the present technology relate to synthetic aperture radar image capturing and scene reconstruction using a cluster of multi-static satellite receivers. More specifically, in some embodiments, the cluster of receivers retrieves a flight path over a communication network. Flying in-formation, a lead or main satellite sends radio or wave pulses to a target area and additional satellites capture an echo of the wave pulses after the waves bounce off the target area to capture SAR radar data. The radar data can be transmitted from the cluster of satellites to a radar stations or to the main satellite. The radar stations or the main satellite receive the SAR radar data and mapping to reconstruct the data as SAR image data that can be reconstructed as 2D or 3D landscapes and scenes using the SAR image data.

20 Claims, 16 Drawing Sheets

3D SCENE RECONSTRUCTION USING MULTI-STATIC CLUSTER RECEIVERS

RELATED APPLICATIONS

This application hereby claims the benefit and priority to U.S. Provisional Application No. 63/061,025, titled "3D SCENE RECONSTRUCTION USING BISTATIC SWARM RECEIVERS," filed Aug. 4, 2020, and U.S. Provisional Application No. 63/165,631, titled "3D SCENE RECONSTRUCTION USING MULTI-STATIC CLUSTER RECEIVERS," filed Mar. 24, 2021, which are hereby incorporated by reference in their entirety.

TECHNICAL FIELD

Various embodiments of the present technology generally relate to 3D imaging and rendering using satellite imaging. More specifically, some embodiments relate to system, methods, and devices for 3D scene reconstruction and modeling, scale rendered analysis, and photogrammetry.

BACKGROUND

With continued urbanization across the globe, traditional two-dimensional maps become increasingly unable to map physical locations of three-dimensional structures due to a lack of three-dimensional and topographical knowledge. Understanding the locations of buildings and their heights in a reliable and scalable manner is a valuable capability that helps address the knowledge gap with both commercial and government entities. Typically, this is done using Electro-Optical photogrammetry through the acquisition of a large stack of images at various look angles. In areas where pilots are free to navigate the skies, this remains a viable solution. In areas of denied access, higher resolution Electro-Optical satellites can be employed with similar results, but in a manner limited to repeating pass orbits that consumes multiple days due to a scarcity of these imaging instruments.

Scientists have shown similar accuracy to high resolution electro-optical through the use of high-resolution synthetic aperture radar (SAR) bistatic collections from the TerraSAR-X/Tandem-X satellite combination. Unfortunately, even this bistatic SAR configuration requires almost a month of collection time for acquisition. This time delay is problematic as weather events and macro-level changes can affect the product quality. Additionally, the sheer expense of high-resolution satellites creates a barrier to launching a constellation size sufficiently large to overcome this time delay problem. With a cluster of low-cost receive-only SAR satellites, the cluster can create single pass 3D models that are not economically unattainable from traditional SAR satellites.

As urbanization and industrialization continue to shape the world, a long-felt need for a low-cost 3D reconstruction system capable of handling vast amounts of data over a single pass persists. The present disclosure covers embodiments relevant to collecting, processing, and rendering 3D imaging using a cluster of bistatic receivers to reconstruct structures and landscapes.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments herein relate to systems, methods, and computer-readable media for performing 3D mapping and scene reconstruction from SAR radar data captured by one or more satellites. In some embodiments, a device has one or more computer-readable storage media and program instructions stored on the one or more computer-readable storage media that, when executed by a processing system, direct the processing system to transmit, from a main satellite comprising a synthetic aperture radar (SAR), at least a radio frequency pulse to illuminate an imaging target, receive, from two or more additional satellites configured to fly in-formation with respect to at least the main satellite, an echo of the radio frequency pulse, generate SAR radar data based at least on the echo, and transmit the SAR radar data to one or more radar stations.

In some embodiments, a system of multi-static cluster satellites may comprise five multi-static cluster receivers and one transmitter. During flight, the cluster of the six satellites flies approximately within a 5- to 10-kilometer spherical radius on a designated flight path. The designated flight path corresponds with the transmitter spacecraft's flight path regardless of differing masses between the transmitter satellite and individual cluster receivers. While operating in low-Earth orbit flying in-formation, the cluster collects image data that may include various combinations of property and landscape image data, global positioning system data, topographical data, and the like.

In such embodiments, the radar-based imaging system may comprise a main satellite with a synthetic aperture radar (SAR) configured to transmit at least a radio frequency pulse to illuminate an imaging target, and two or more additional satellites configured to fly in-formation with respect to at least the main satellite, wherein each satellite, of the two or more additional satellites, is configured to receive at least an echo of the radio frequency pulse, generate SAR image data based at least on the echo, and transmit the SAR image data to one or more radar stations.

Other embodiments relate to a radar-based image computing apparatus. The computing apparatus comprises one or more computer-readable storage media and program instructions stored on the one or more computer-readable storage media that, when executed by a processing system, direct the processing system to perform functions. Such functions comprise transmitting at least a radio frequency pulse produced by a main satellite comprising a SAR configured to illuminate an imaging target, receiving, by two or more satellites configured to fly in-formation with respect to at least the main satellite, at least an echo of the radio frequency pulse, generating SAR image data based at least on the echo, and sending the SAR image data downstream.

Another embodiment relates to a method of operating a radar-based imaging system. First, a main satellite comprising a synthetic aperture radar transmits a radio frequency pulse to illuminate an imaging target. Upon the radio frequency pulse reflecting off of the imaging target and creating an echo, two or more additional satellites configured to fly in-formation with respect to at least the main satellite, receive the echo of the radio frequency pulse. Then, the two or more additional satellites collect and generate SAR radar data based at least on the echo and transmit the SAR radar data to one or more radar stations. The radar station receives the SAR radar data and prepares it for reconstruction into SAR image data by the image processor. Once the image processor receives and performs analysis on the SAR radar data, it communicates formed SAR images downstream.

Further embodiments relate to a computing apparatus configured to communicate with a further cluster of satellites to process radar data. The computing apparatus comprises one or more computer-readable storage media and program instructions stored on the one or more computer-readable storage media that, when executed by a processing system, direct the processing system to perform functions. Some functions comprise transmitting, from a first satellite of a first cluster of satellites, a tasking request to at least one satellite of two or more additional satellites. The two or more additional satellites are configured to fly in-formation with respect to a further satellite as part of a second cluster of satellites. The computing apparatus then directs the satellite that receives the transmission from the first satellite to relay the tasking request to the further satellite. Then, the further satellite is configured to communicate the tasking request to each satellite of the two or more additional satellites. Finally, the computing apparatus is configured to direct the further satellite and the two or more additional satellites to perform coordination maneuvers based at least on the tasking request.

Another embodiment relates to a method of processing radar data on-board a radar-based imaging system after capturing it. The method begins with a main satellite, comprising a synthetic aperture radar, transmitting at least a radio frequency pulse to illuminate an imaging target. Two or more additional satellites that are configured to fly in-formation with respect to at least the main satellite receive at least an echo of the radio frequency pulse, generate SAR image data based at least on the echo, and communicate the SAR image data to the main satellite. On-board the main satellite, one or more graphical processing units process the SAR image data to be used downstream.

While multiple embodiments are disclosed, still other embodiments of the present technology will become apparent to those skilled in the art from the following detailed description, which shows and describes illustrative embodiments of the invention. As will be realized, the technology is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings in which.

Figure 1A:
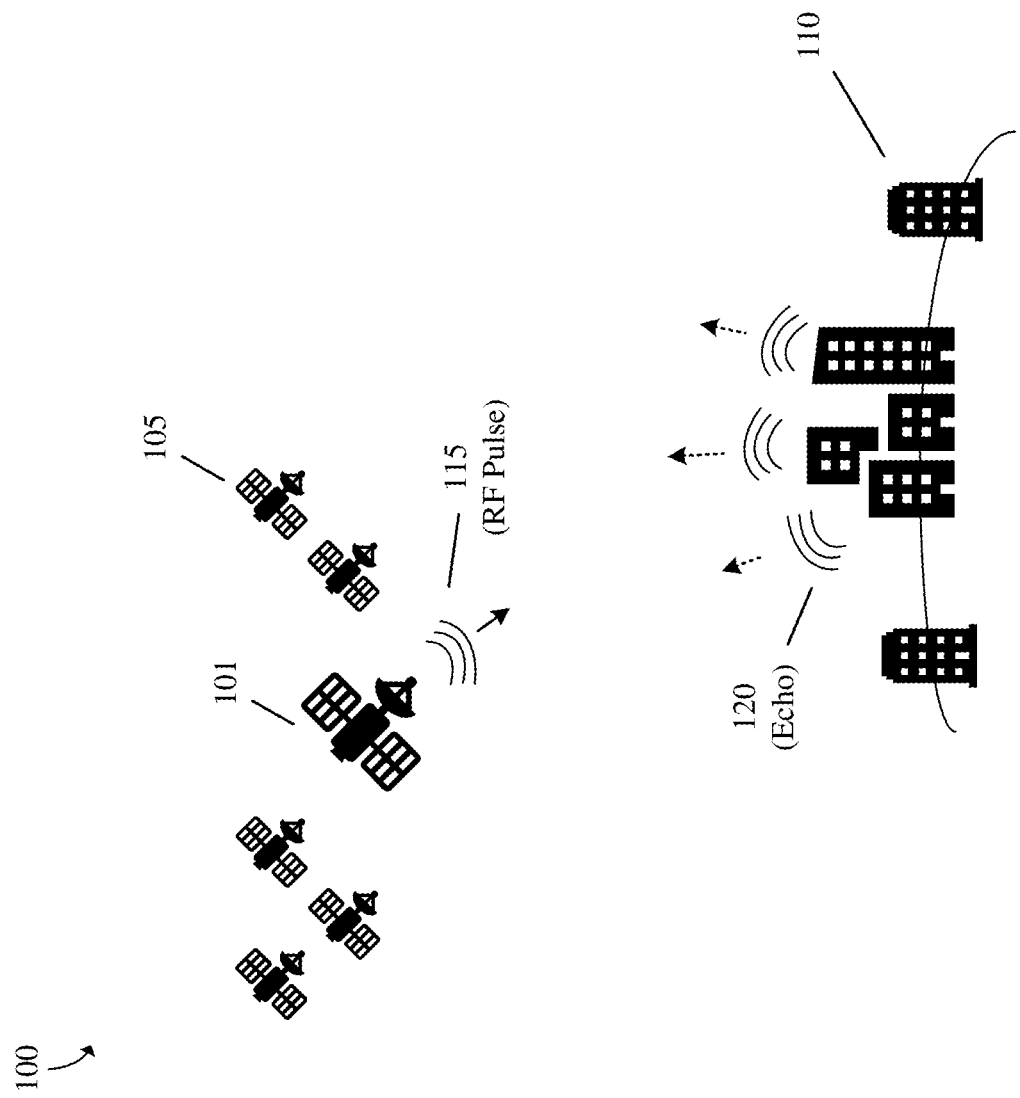
FIGS. 1A, 1B, 1C, and 1D illustrate exemplary operating environments in which some embodiments of the present technology may be utilized.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to systems, methods, and computer-readable media for capturing satellite image data, performing rendering analysis, and reconstructing radar data into formed images from a group of satellite receivers. Synthetic aperture radar (SAR) technology can be used to capture large areas from far distances. Using five SAR receivers in a cluster of satellites flying closely together in the same low-Earth orbit allows for a low-cost and efficient method of capturing landscape imagery in a single pass. Unlike alternative SAR options, the cluster of receivers allows for quicker capture with less passes required to obtain photogrammetry data. Thus, the use of the cluster of receivers provides a superior alternative to other SAR options especially in highly regulated or difficult to access places.

The cluster of receivers can be implemented to reduce costs, save time, and gather important topographical data that can impact safety, city or state decision-making, or other business operations. In some scenarios, the 3D models generated from the cluster of receivers can be used in commercial environments to capture a snapshot of the current landscape and population. That data may be compared with previous snapshots to understand the development of urbanization, landscape development, and population growth, among other things. In another example, the 3D models generated may benefit companies attempting to implement 5G wireless networks, so the company can understand building developments and obstructions before implementation of the network.

Various embodiments of the present technology provide a method of capturing radar-based image data. Capturing the data begins with a main satellite comprising a SAR transmitting at least a radio frequency (RF) pulse to illuminate an imaging target. The wave or RF pulse may reflect off the imaging target in various directions. Next, a group of two or more additional satellites configured to fly in-formation with respect to at least the main satellite receive the echoes of the RF pulse. Once the echoes are received, the group of two or more additional satellites generate SAR data based on the echoes received and finally transmit the SAR data to the main satellite or to one or more radar stations. Using the cluster of SAR receivers, larger terrain or more detailed radar data can be captured to identify specific landscapes, elevation, and geologic and topographic features, for example. In some embodiments, the satellite orbits may be automated or programmed to capture radar data from specific imaging targets. SAR technology may be used to capture high-resolution radar data and tomography which can be transmitted to a centralized location for processing in real time. The images may then be processed (e.g., interferometrically) and/or orthorectified to render 3D mappings in computer-aided design models and various file formats, for example.

Some embodiments provide for unique operation and functionality of an image processor. In accordance with some embodiments, an image processor, such as one or more graphical processing units, may receive radar data from a radar station that downloads data from a group of two or more satellites. Alternatively, the image processor may be configured to operate on-board a radar-based imaging system. The image processor may comprise a virtual processor in a secure edge node that allows the processor to communicate with outside networks and maintain security of the data. The image processor of a radar-based imaging system may facilitate computational operations to reconstruct the data received into SAR image data. The SAR image data may comprise two-dimensional and/or three-dimensional renderings of high-resolution data to form images captured during a flight pattern of the group of two or more satellites. The image processor may be coupled with one or more cloud networks that may support the satellites in their orbit or flight pattern or may receive formed image data from the processor to store information securely. The image processor may communicate with one or more cloud networks over a communication link, such as a virtual private network (VPN), secure file transfer protocols (SFTP), application programming interfaces (API), or the like.

A further embodiment provides for cross-cluster tasking wherein one cluster of satellites can communicate with a further cluster of satellites to update its mission tasks. In accordance with some embodiments, a first satellite of a first cluster of satellites, transmits a tasking request to at least one satellite of a further cluster of satellites. The at least one satellite that receives the tasking request then relays the tasking request to a further satellite in the further cluster of satellites. The further satellite communicates the tasking request to each of the satellites in the further cluster of satellites which allows the further cluster of satellites to update its course and perform coordination maneuvers based on the tasking request.

Figure 1B:
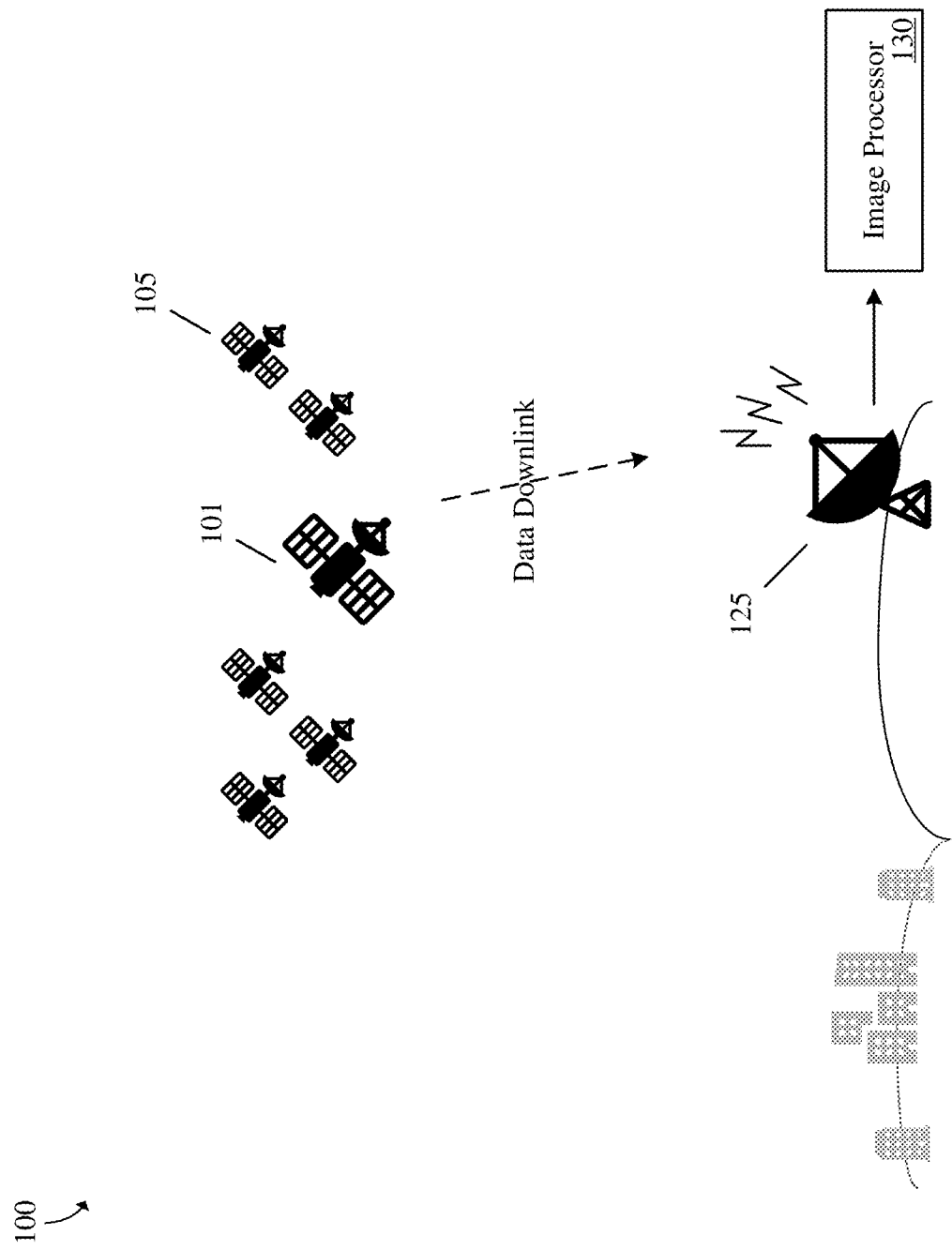

Now referring to the Figures, FIGS. 1A, 1B, 1C, and 1D illustrate exemplary operating environments in accordance with various embodiments. FIGS. 1A and 1B illustrate an exemplary operating environment 100 in which some embodiments of the present technology may be utilized. FIG. 1A demonstrates a group of satellites flying in-formation that send pulse waves towards structures on the ground to capture radar data of the area. FIG. 1A includes operating environment 100 which further includes main satellite 101, group of satellites 105, and imaging target 110. Also included are radio frequency (RF) pulse 115 and echo 120.

In accordance with various embodiments, main satellite 101 comprises a synthetic-aperture radar (SAR) to capture radar data. In some embodiments, main satellite 101 may be a transmit-only receiver remotely controlled to capture desired radar data. Main satellite 101 may lead in front, follow behind, or fly in between group of satellites 105. It may be the same size and/or mass as the other satellites. In other embodiments, main satellite 101 may be larger than the other satellites, it may control the orbit that the satellites fly in, and it may not only transmit but also receive data and communications. While flying in low-Earth orbit, main satellite 101 transmits RF pulse 115 over imaging target 110 to capture SAR data of the target. RF pulse 115 may be transmitted in an X-band frequency range or some other frequency range. Upon RF pulse 115 reaching imaging target 110, one or more of echo 120 rebounds off imaging target 110, creating radar data.

As illustrated, group of satellites 105 flies in-formation with respect to at least main satellite 101, also in low-Earth orbit. In various embodiments, group of satellites 105 functions to receive the one or more of echo 120 that reflects off imaging target 110. Echo 120 provides data from various perspectives of imaging target 110, such as the height and location of structures, for example. Because group of satellites 105 comprises at least two or more satellites, the satellites may receive echo 120 from different angles and points in time, allowing for mass capture of radar data in a single pass by the entire cluster of satellites.

Still referring to FIG. 1A, imaging target 110 may be one or more buildings, factories, man-made structures, private residences, natural formations, or the like with varying topologies. Using SAR radar data, group of satellites 105 collects various data points from the returning echoes 120. RF pulse 115 may be a single transmission of waves or it may be a continuous pulse of waves while flying over the target. Each satellite in group of satellites 105 may comprise an antenna used to capture the returning echo 120. The data captured by the antennas may include SAR radar data to be used downstream in the reconstruction process.

Moving to FIG. 1B, FIG. 1B illustrates an exemplary operating environment 100 in which some embodiments of the present technology may be utilized. FIG. 1B includes environment 100 wherein the environment demonstrates main satellite 101 and group of satellites 105 operating at a different point in time than as shown in FIG. 1A. At this point in time, the satellites orbit over radar station 125 that comprises image processor 130. While flying in low-Earth orbit or mid-inclination orbit, the satellites downlink the SAR radar data to radar station 125. The data downlink performed by the satellites may operate in X-band, S-band, or a similar frequency range. Further, in some embodiments, the data downlink may occur automatically when flying nearby the radar station 125, it may occur when manually commanded to by radar station 125, or it may occur in real-time as the group of satellites 105 receive the echoes from the transmitted RF pulses reflecting off of the imaging target.

In some embodiments, radar station 125 is located on the ground or on a moving object, such as a ship. It may include one or more antennas to perform downlinking processes from the satellites in orbit, or to perform uplinking processes to the satellites. When performing downlinking to the radar station 125, the transmission can be communicated in the X-band frequency range or a similar range. Likewise, uplinking from radar station 125 to the satellites may also be performed in X-band frequency range. Once SAR radar data is downloaded from the satellites to radar station 125, radar station 125 transmits the collected data to image processor 130. Image processor 130 may comprise either one or more central processing units (CPUs) or one or more graphical processing units (GPUs) configured to generate SAR images from the collected radar data. Image processor 130 is directed to receive SAR radar data from one or more radar stations and to generate SAR image data from at least the SAR radar data. Generating SAR image data may comprise functions such as image formation, geo-location, ortho-rectification, interferometry, SAR tomography, or the like. Such computational processes can be performed in a virtual processor local or remote to the radar station. In some embodiments, a remote image processor 130 may receive SAR radar data over a SFTP, an API, or the like.

Figure 1C:
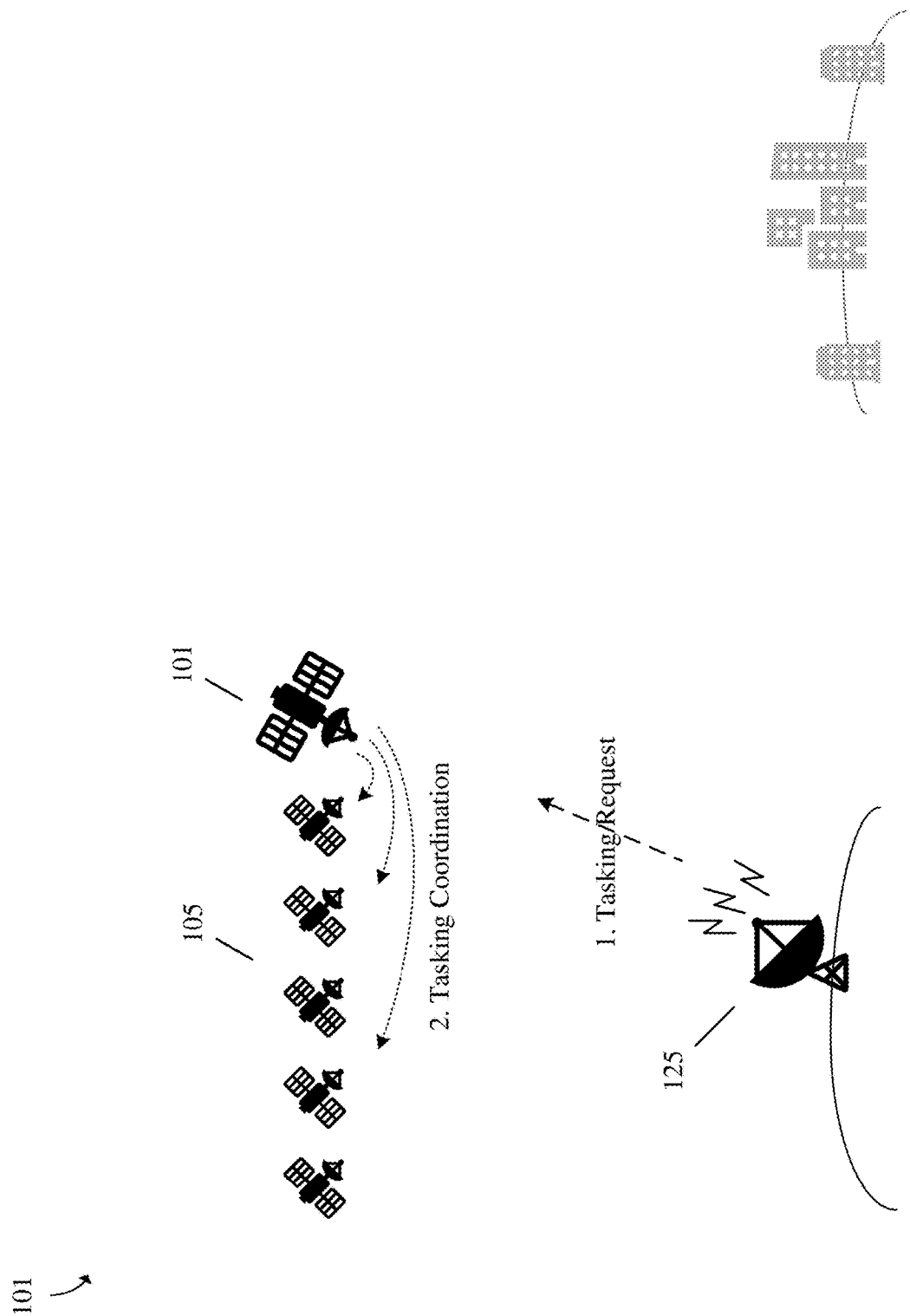

Other embodiments may be appreciated by those skilled in the art, such as the embodiment shown in FIG. 1C. FIG. 1C illustrates a further exemplary operating environment in which some embodiments of the present technology may be utilized. FIG. 1C includes operating environment 101, which further includes main satellite 101, group of satellites 105, and radar station 125.

As illustrated, main satellite 101 flies in low-Earth orbit with group of satellites 105 trailing behind in an evenly, horizontally distributed manner. In some examples, group of satellites 105 flies within 5-10 kilometers apart from each other and main satellite 101. In other examples, the distance between each of the satellites may be greater or lesser. First, as the cluster of satellites orbits over radar station 125, radar station 125 communicates with main satellite 101. The communication, which may be performed in the X-band frequency range, sends a tasking request to main satellite 101. In various embodiments, the tasking request comprises flight pattern instructions, an imaging target and location, a transmission duration, a target velocity and positioning range, two-line element sets, coordination instructions for group of satellites 105, and more.

Upon receiving tasking request from radar station 125, main satellite 101 communicates with each of the satellites in group of satellites 105 to relay the tasking request and perform coordination maneuvers. Main satellite 101 may communicate with each of the satellites in group of satellites 105 in the X-band frequency range. It may be noted that other frequency ranges can also be used to accomplish this task. Once group of satellites 105 receives the tasking coordination message, each satellite angles itself towards the imaging target and adjusts its course accordingly, if not already in position. This also allows each satellite in the group of satellites to arrange as omni-direction communication links. In other embodiments, radar station 125 may communicate directly with each of the satellites.

Figure 1D:
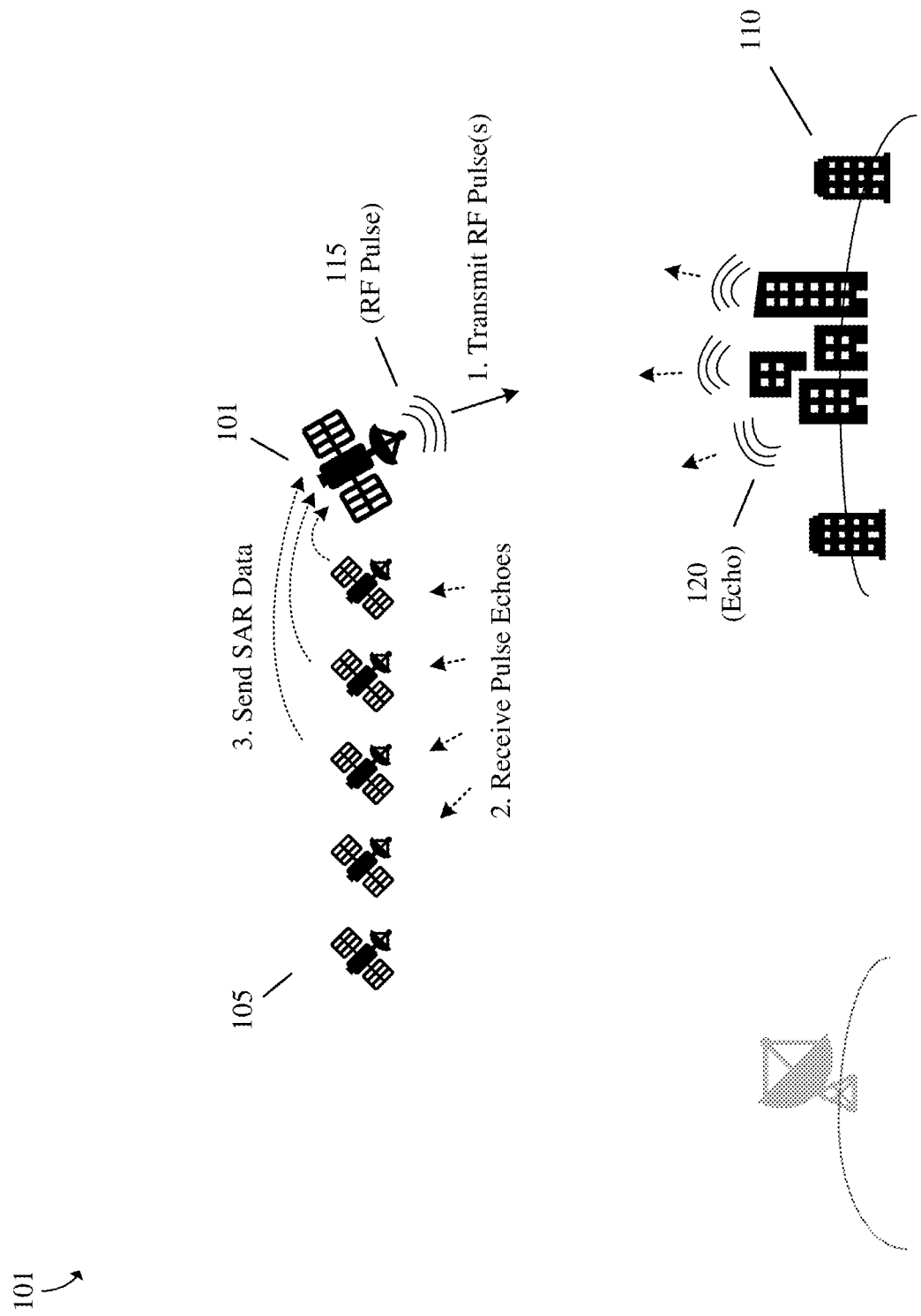

FIG. 1D illustrates an exemplary operating environment in which embodiments of the present technology may be utilized. Following FIG. 1C, FIG. 1D also illustrates operating environment 101, which further includes main satellite 101, group of satellites 105, imaging target 110, RF pulse 115, and echo 120. In FIG. 1D, the cluster of satellites operates at some later time than illustrated in FIG. 1C, where the cluster of satellites performs SAR data capture and processing functions.

Once main satellite 101 and trailing group of satellites 105 reach the tasked location and orbit some distance near imaging target 110, main satellite, equipped with SAR technology, transmits RF pulse 115 towards imaging target 110 to illuminate structures and landscapes present. As RF pulse 115 hits structures in imaging target 110, echoes 120 rebound off the surfaces and are received by each of the satellites in group of satellites 105. Each satellite receives echoes 120 at different locations and times meaning the data collected from imaging target 110 contains more information than can be captured by a single satellite pass.

After collecting the transmissions sent from main satellite 105, each satellite in the group of satellites 105 transmits the SAR data it captured to main satellite 101. Group of satellites 105 may each communicate with main satellite 101 over an X-band frequency range. In various embodiments, main satellite 101 comprises an on-board graphics processing unit (GPU) or other image processor to compile the SAR data and form images of imaging target 110. Main satellite 101 can communicate the formed images downstream or store them for later use in computer-readable storage media. In other embodiments, main satellite 101 may communicate the unprocessed SAR data downstream.

Figure 2A:
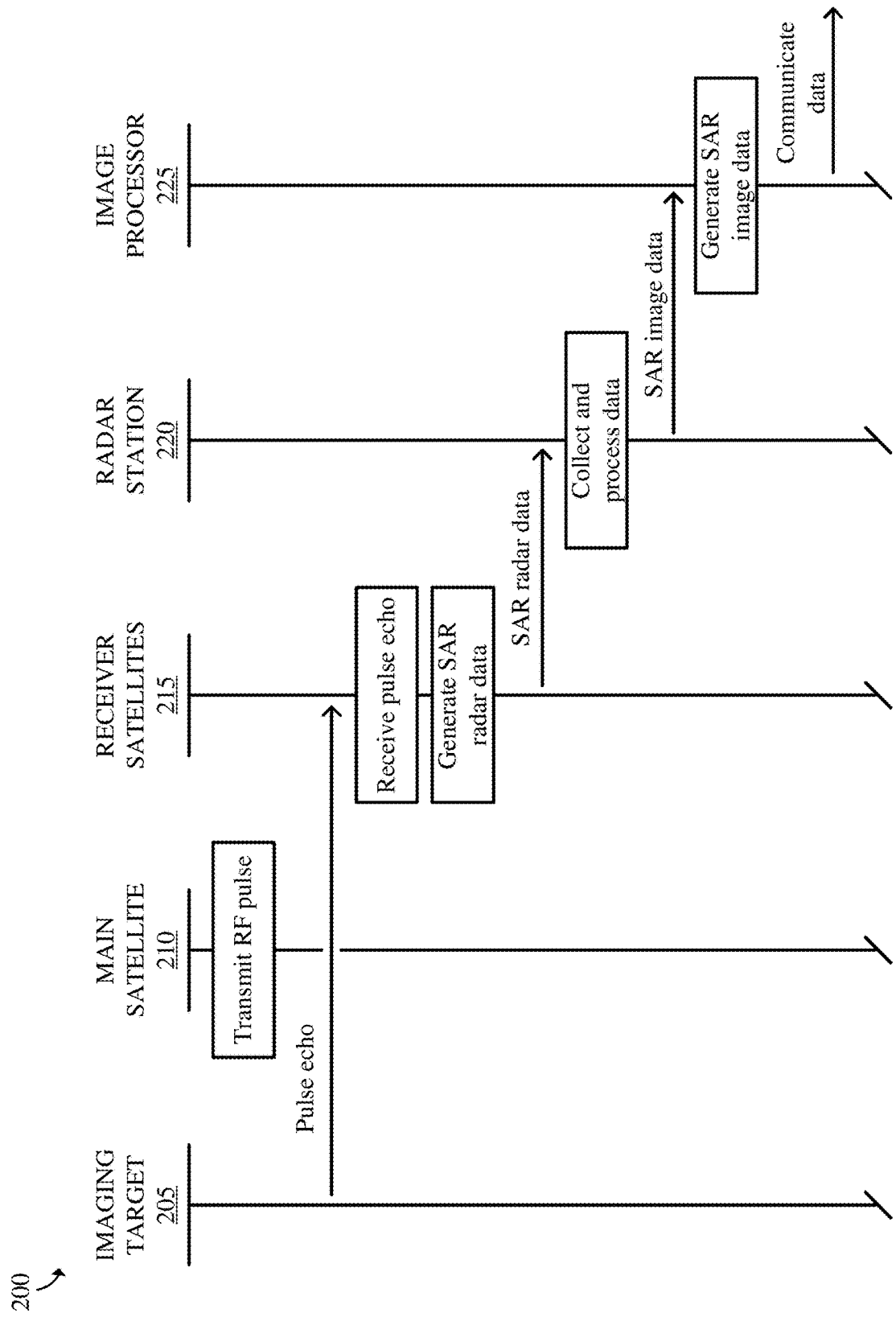
FIGS. 2A and 2B illustrate sequence diagrams of data flow between various components of a radar-based imaging system in accordance with some embodiments of the present technology.
Figure 2B:
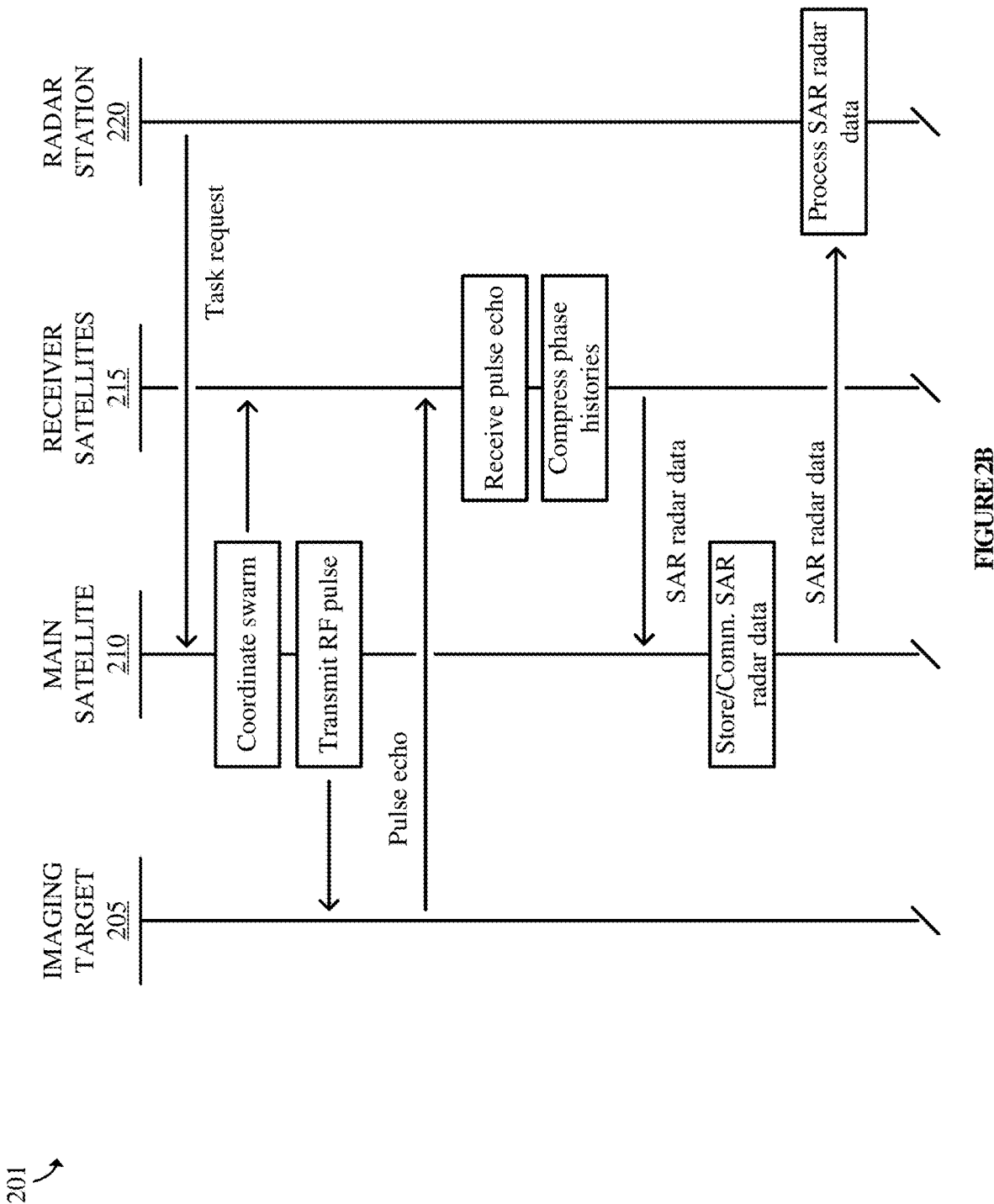

FIGS. 2A and 2B illustrate sequence diagrams that demonstrate the data flow between various components of a radar-based imaging system in accordance with some embodiments of the present technology. In FIG. 2A, a satellite transmits signals to a target on Earth to capture SAR data that can be processed by an image processor. FIG. 2A includes environment 200, where environment 200 further includes imaging target 205, main satellite 210, receiver satellites 215, radar station 220, and image processor 225.

In various embodiments, main satellite 210 may comprise a SAR to capture high-resolution radar data. First, main satellite 210 transmits one or more RF pulses to Earth to illuminate a target area, such as imaging target 205. Imaging target 205 may comprise an area on Earth including buildings, man-made structures, landscapes, private residences, and the like. When RF pulses hit imaging target 205, the pulses reflect off the surfaces of imaging target 205 and create one or more pulse echoes. The pulse echoes radiate upwards where receiver satellites 215 each comprising an antenna can receive the one or more pulse echoes. Using the radar data received from the one or more pulse echoes, receiver satellites 215 may generate SAR radar data and transmit it one or more radar stations 220 located on Earth. Radar station 220 may download the SAR radar data via an X-band frequency range.

Once radar station 220 has collected the radar data, radar station 220 processes and converts the radar data into SAR image data for image processor 225 to intake the data. Image processor 225 may receive the image data over an SFTP, an API, or the like in a secure edge node. In some embodiments, image processor 225 comprises a virtual processor that performs various functions to reconstruct the SAR image data into formed images. As an example, some functions that may be performed by image processor 225 include image formation, ortho-rectification, and geo-location. Upon formation or production of images from the SAR image data, image processor 225 may communicate the images downstream. In at least one embodiment, image processor 225 communicates the images to a remote cloud storage service.

FIG. 2B illustrates a sequence diagram in which a main satellite coordinates a cluster of receiver-satellites to capture radar data and processes the data on-board. FIG. 2B includes environment 201, where environment 201 further includes imaging target 205, main satellite 210, receiver satellites 215, and radar station 220.

In various embodiments, main satellite 210 and receiver satellites 215, a cluster of two or more satellites flying in-formation with respect to main satellite 210, fly in low- Earth orbit. While in orbit, a radar station 220 communicates with main satellite 210 and sends a task request to be performed by all the satellites. The task request may include various instructions such as a target velocity range, a location of an imaging target 205, a configuration for capturing radar data, and the like. Main satellite 210 coordinates the cluster of receiver satellites 215 by communicating the task request to each of receiver satellites 215. If improperly aligned or spaced, receiver satellites 215 prepare to receive data. Main satellite 210 then transmits one or more RF pulses towards imaging target 205. The RF pulses reflect off surfaces of imaging target 205 and travel back towards the cluster of satellites to be received by receiver satellites 215. Each of receiver satellites 215 performs functions, such as phase history compression among other functions, to the captured SAR data, and communicates the SAR data to main satellite 210. In such embodiments, main satellite 210 comprises a GPU to process the SAR data into SAR images. Main satellite 210 then communicates the SAR images downstream to radar station 220, for example. In other embodiments, main satellite 210 may comprise one or more CPUs instead or in addition to a GPU.

Figure 3:
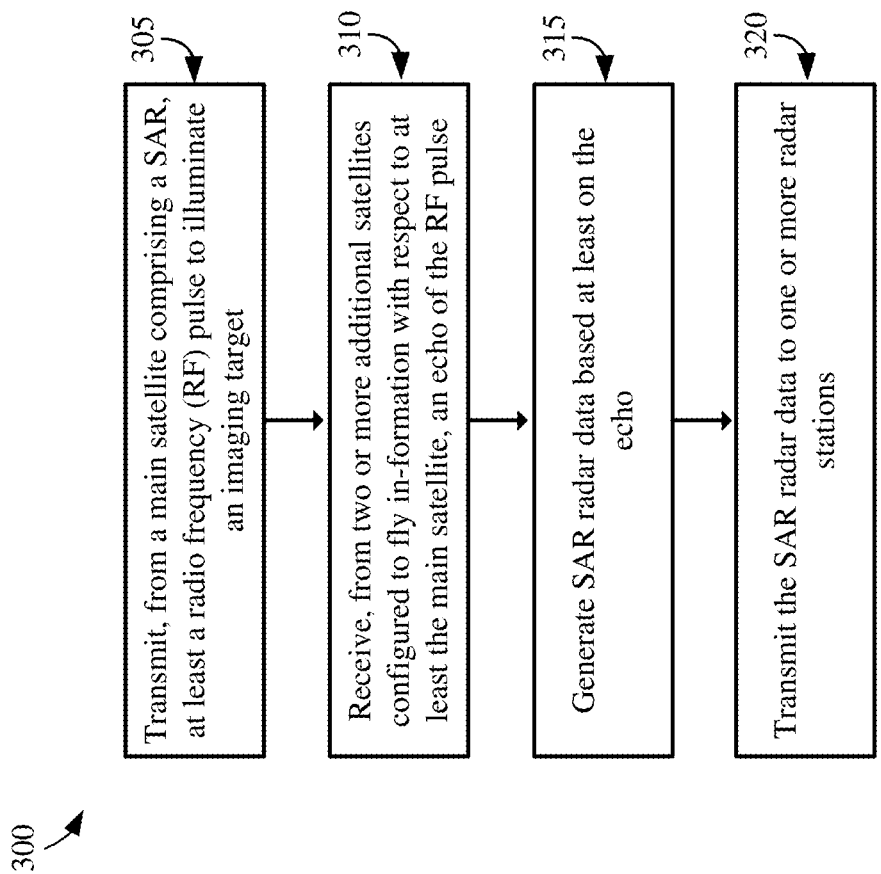
FIG. 3 is a flowchart illustrating a set of operations for radar-based image processing in accordance with some embodiments of the present technology.

FIG. 3 is a flowchart illustrating a set of operations for radar-based image processing in accordance with some embodiments of the present technology. In the set of operations illustrated in FIG. 3, a group of satellites transmit signals to receive radar data. A radar station collects and processes the data retrieved by the satellites and then sends the processed data downstream. FIG. 3 includes environment 300, where environment 300 further includes transmission step 305, reception step 310, generation step 315, and downlink step 320.

Beginning with the initial transmission step 305, a main satellite comprising a SAR transmits a signal or RF pulse over a target area to illuminate the target. As the main satellite travels a distance over the imaging target and sends pulses, two or more additional satellites, configured to fly in-formation with respect to at least the main satellite, receive one or more echoes of the RF pulses that reflect off the imaging target, as shown in reception step 310. Each of the additional satellites has an antenna to receive the radar data over the distance and time of the transmission by the main satellite. At generation step 315, the two or more additional satellites generate SAR radar data based at least on the one or more echoes received from the reflection off the imaging target. Lastly, at downlink step 320, the two or more additional satellites may transmit the SAR radar data to one or more radar stations located on Earth. Like the group of satellites, the one or more radar stations comprise an antenna to receive the data downlink. The data downlink signal may be transmitted in the X-band frequency range.

In some examples, the main satellite may collect and compile the SAR radar data from each of the additional satellites after the additional satellites receive the echoes of the RF pulses in reception step 310 and generate the SAR radar data in generation step 315. Then, the main satellite may transmit the SAR radar data to the one or more radar stations in downlink step 320.

Figure 4:
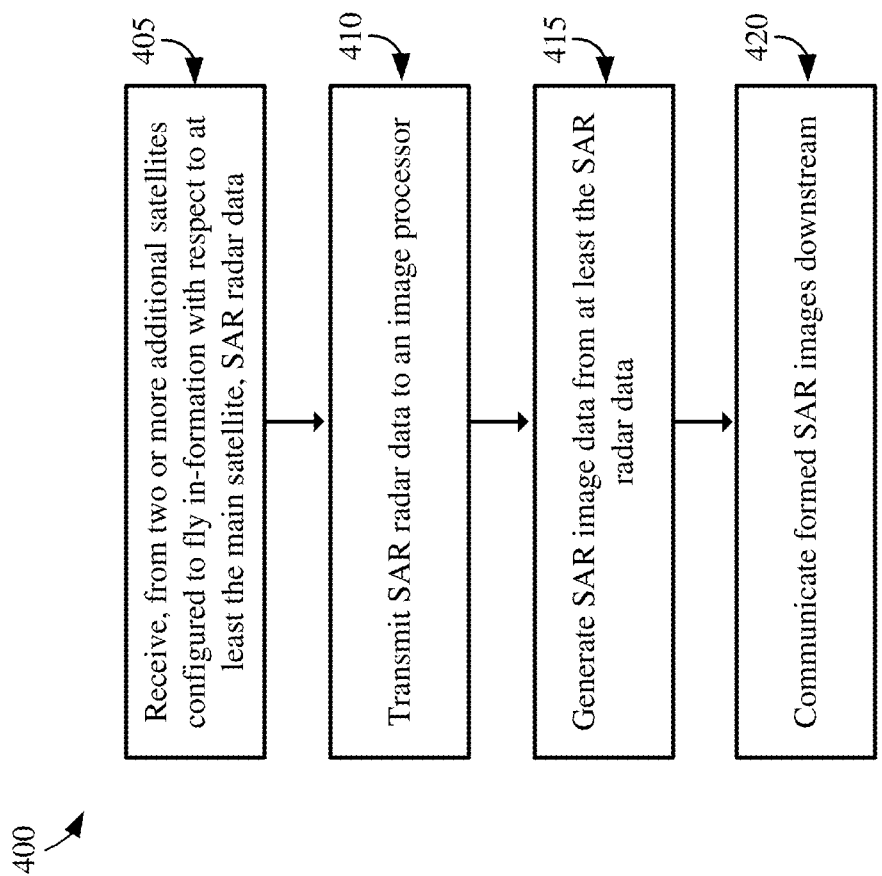
FIG. 4 is a flowchart illustrating a set of operations for radar-based image processing in accordance with some embodiments of the present technology.

Moving to FIG. 4, FIG. 4 demonstrates a flowchart illustrating a set of operations for radar-based image processing in accordance with some embodiments of the present technology. In the set of operations illustrated in FIG. 4, an image processor receives SAR radar data from a group of satellites and generates SAR radar data to be reconstructed into formed images. FIG. 4 includes environment 400, where environment further includes reception step 405, transmission step 410, generation step 415, and communication step 420.

First, at reception step 405, two or more additional satellites, aside from the main satellite, configured to fly in-formation with respect to at least the main satellite, receive SAR radar data. The additional satellites may receive the radar data from RF pulse echoes directed at a target area transmitted by the main satellite. Next, at transmission step 410, an image processor may download the SAR radar data from the satellites. In some embodiments, the download may occur over the X-band frequency range. Once the image processor collects the SAR radar data, it may generate SAR image data from at least the SAR radar data, as shown in generation step 415. Generation step 415 may comprise various reconstruction processes including, but not limited to, image formation, ortho-rectification, and geolocation among other image reconstruction processes. Finally, at communication step 420, the image processor may send the formed images from the SAR image data downstream to be used by other systems, devices, applications, and the like.

Figure 5:
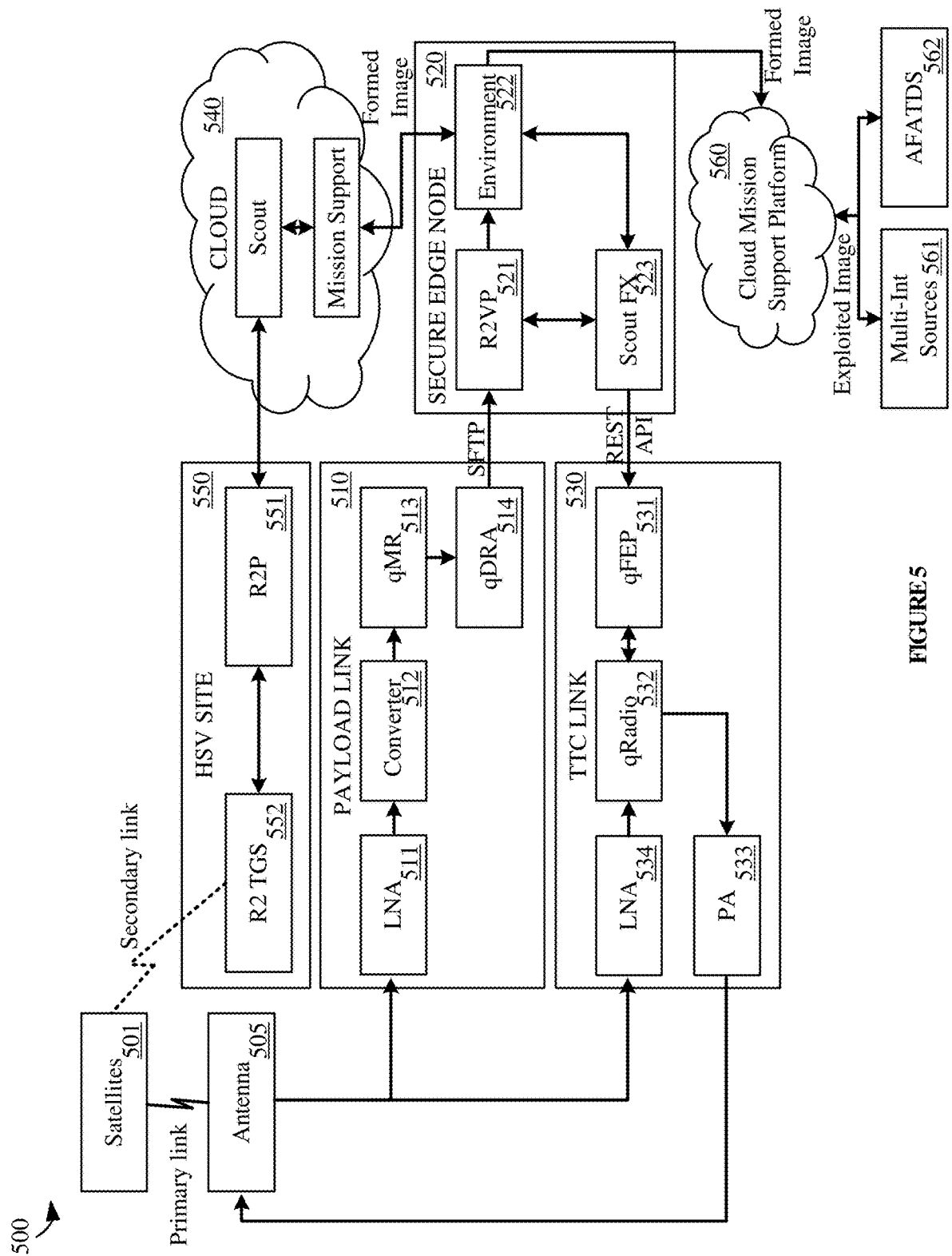
FIG. 5 illustrates an example of a system architecture for a radar-based imaging system in accordance with some embodiments of the present technology.

FIG. 5 illustrates an exemplary system architecture for a radar-based imaging system in accordance with some embodiments of the present technology. The system architecture allows for one or more satellites to transmit radar data to an antenna, as part of a radar station, and convert the radar data to be used as inputs for an image processor to generate formed SAR images. FIG. 5 includes environment 500 which further includes satellites 501, antenna 505, payload link 510, secure edge node (SEN) 520, telemetry, tracking and command link (TTC) 530, cloud 540, HSV site 550, and cloud mission support platform (CMSP) 560.

In some embodiments, satellites 501 may comprise at least one main satellite and two or more additional satellites. Via a primary link, satellites 501 downlink SAR radar captured during a mission to antenna 505. Antenna 505 may located on a radar station, which may be located on the ground on Earth or on a moving object, such as a ship, for example. Antenna 505 then sends the transmitted SAR radar data to payload link 510 and TTC link 530. Payload link 510 further includes low-noise amplifier (LNA) 511, converter 512, qMR 513, and qDRA 514. The components of payload link 510 may amplify and/or convert the SAR radar data into data capable of being input into an image processor.

Next, payload link 510 sends the converted SAR radar data to SEN 520, which includes virtual processor 521, environment 522, and Scout FX application 523. SEN 520 may comprise a graphics processing unit (GPU) enhanced computing node that performs SAR image formation and provides a tactical tasking user interface. In some embodiments, SEN 520 may interface with payload link 510 to receive demodulated raw binary SAR data and pass that information to the virtual processor 521. Virtual processor 521 may perform various functions on the data such as image formation, ortho-rectification, and geo-location. It may also provide formed images in Sensor Independent Complex Data (SICD) format to Scout FX application 523 and environment 522. Scout FX application 523 may enable users to retrieve and view collected, formed images.

In some embodiments, environment 522 on SEN 520 may interface with CMSP 560 in various non-secure and secure cloud environments. CMSP 560 may provide image analysis, exploitation, and dissemination to call-for-fire systems such as Advanced Field Artillery Tactical Data System (AFATDS) 562 and other intelligence sources and applications for data fusion, such as multi-int sources 561. Based on data exploitation and fusion with other data sources, the CMSP 560 may cue Scout FX application 523 for re-tasking of satellites 501 for further data collection on areas of interest (AOIs). Scout FX application 523 may communicate with TTC link 530 over a REST API. TTC link 530 comprises a low-noise amplifier 534, qRadio 532, qFEP 531, and PA 533 that may accomplish such tasks.

Additionally, environment 522 on SEN 520 may interface with cloud 540. Cloud 540 may be accessed to view or retrieve formed images from SEN 520. Further, cloud 540 may interface with HSV site 550, which includes R2P 551 and terminal ground station (TGS) 552. In some embodiments, based on the formed images stored in cloud 540, HSV site 550 may command satellites 501 to capture further images of the same or a different area of interest via a secondary link to satellites 501.

Figure 6:
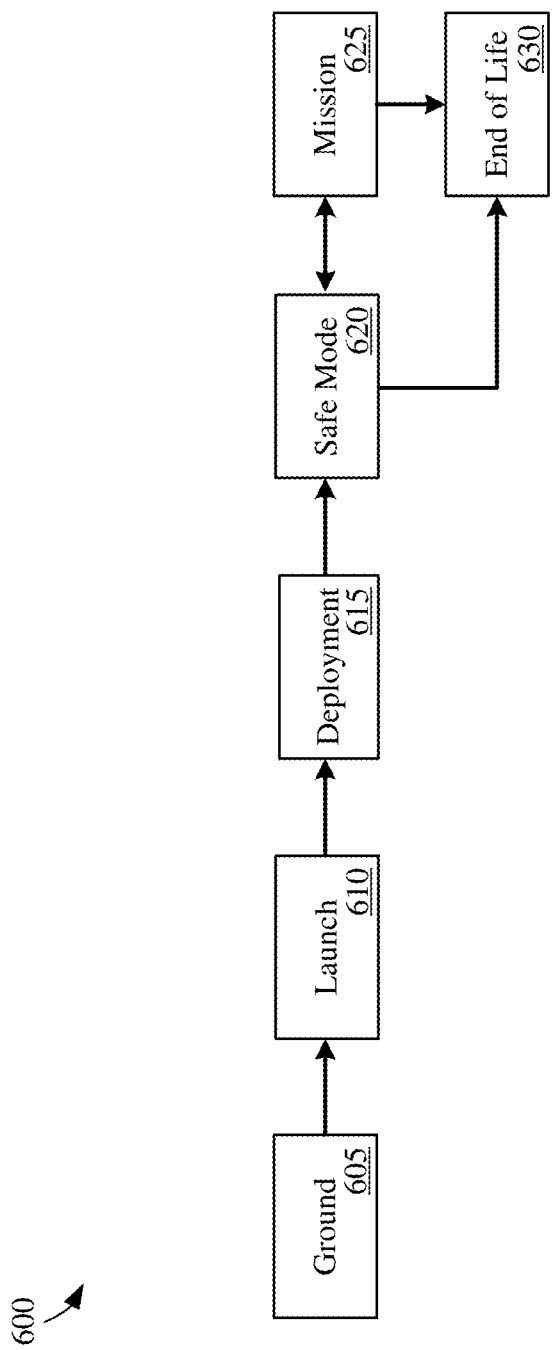
FIG. 6 is a flowchart illustrating a mode of operations through the course of a satellite spacecraft's lifecycle in accordance with some embodiments of the present technology.

FIG. 6 is a flowchart illustrating a mode of operations through the course of a satellite spacecraft's lifecycle in accordance with some embodiments of the present technology. FIG. 6 includes environment 600 which further includes ground step 605, launch step 610, deployment step 615, safe mode step 620, mission step 625, and end of life step 630. Beginning at ground step 605, the one or more satellites are in a state of operation after an initial assembly before launching into orbit. This stage may allow for integration, factory testing (including alternative communications via landline), and pre-launch preparation activities. Next, launch step 610 describes the state of the one or more satellites while in-transit to their designated orbit. In this stage, the satellites await verification from a remote location before initiating deployment step 615. In some embodiments, a centralized location or mission control may send communications to the one or more satellites via a wireless communication to designate the proposed orbit. In other embodiments, the satellite may comprise a computer apparatus with one or more computer-readable storage media comprising program instructions stored on the one or more computer-readable storage media that, when executed by a processing system, direct the processing system to at least initiate the deployment stage.

Moving to deployment step 615, immediately following launch and subsequent separation from a dispenser, the one or more satellites undergoes an initialization sequence. Certain operational sequences may automatically begin, such as altitude stabilization and solar array deployment. In some embodiments, these activities may occur independently of a first contact with ground control systems or mission control.

At safe mode step 620, the one or more satellites operate with only essential equipment. In various embodiments, essential equipment may include, but is not limited to, basic power and thermal management, communications, and altitude stabilization. Safe mode step can be part of planned operations, but in other cases, safe mode can be utilized under stressed conditions, such as during equipment failures or alarming behavior detected by the ground control systems or mission control. Safe mode may be transitioned into a different mode, like mission operations or end of life operations by an issued command from ground station control.

Transitioning to mission step 625, mission mode describes the operation when the one or more satellites carries out "normal" operations, as in their designated mission. Safe mode may be multi-faceted and non-linear. For example, this stage may incorporate multiple operations occurring simultaneously. Such operations may include telemetry, tracking, and command (TTC), orbit control, and SAR collection and data downlink (payload operations). Mission mode may be active when the spacecraft health is both known and deemed well enough to carry out mission operations. Otherwise, the one or more satellites may automatically switch to safe mode and revert to safe mode step 620.

Lastly, at end of life step 625, the one or more satellites may be deemed inoperable or incapable of fulfilling their mission. In some embodiments, ground system control or mission control may remove the one or more satellites from its licensed orbit per responsible space operations. During this step, the spacecraft may or may not have functioning systems as it de-orbits and completes its lifecycle.

Figure 7A:
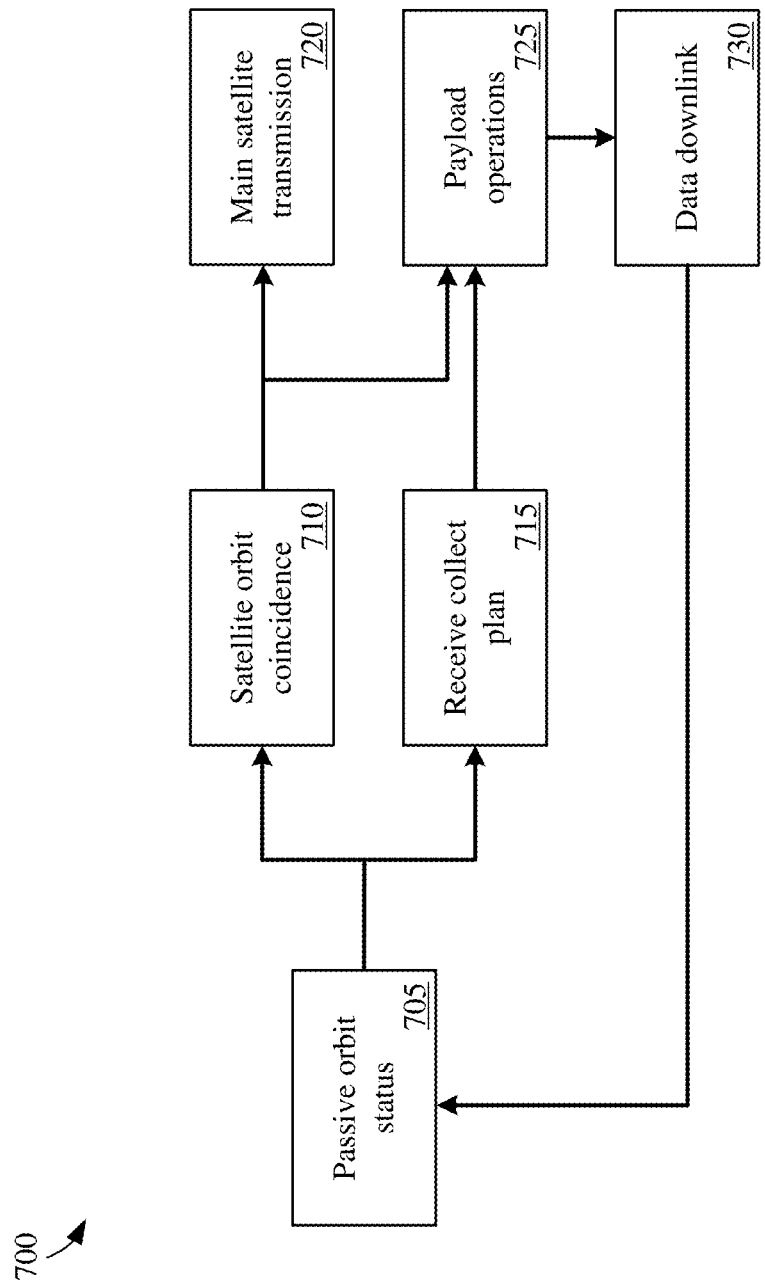
FIGS. 7A and 7B demonstrate exemplary sets of operations that may be performed by a satellite spacecraft in accordance with some embodiments of the present technology.

FIG. 7A illustrates an exemplary set of operations that may be performed by a satellite spacecraft in accordance with some embodiments of the present technology. FIG. 7A includes environment 700, which further includes passive operations step 705, satellite orbit step 710, reception step 715, transmission step 720, payload operations step 725, and data downlink operation step 730.

Beginning at passive operations step 705, the one or more satellites may receive real-time or delayed/scheduled execution commands to begin their mission. In some embodiments, the satellite(s) may operate with minimal or nominal power and nominal thermal management. During this step, the one or more satellites may communicate via X-band, S-band, or another frequency range to send or receive information with mission control. In some embodiments, no specific attitude control is needed to conduct S-band communications when the one or more satellites has an omni-directional TTC transponder.

Moving to satellite orbit step 710 and reception step 715, the ground control or mission control systems designate an orbit and allow the satellite to separate from a launch vehicle. At this stage, the spacecraft may maintain orbital parameters like RAAN, eccentricity, inclination, and perigee. The spacecraft may encounter small disturbances in its orbit due to atmospheric drag and gravitational fields, so operations to maintain a consistent course and geometry may be used. Such operations may be performed by electronic propulsion systems. Further, at these two steps, additional satellites may receive TTC information to follow the main satellite in orbit. The additional satellites may operate in-orbit in front, behind, or a combination thereof with respect to the main satellite.

Next, at transmission step 720 and payload operations step 725, the main satellite and additional satellites may work in conjunction to create a multi-static radar system. The satellites, together, may have an associated attitude control mode. While the main satellite may operate at a higher power consumption level during mission operations, the additional satellites may operate more passively requiring little power resources. The multi-static collection period wherein all satellites function together, may be limited by the orbital intercepts between the additional satellites and the main satellite. During collection operations, a specific collection geometry may dictate collection time and the amount of data retrieved. In such operations, the main satellite, comprising a SAR payload, may transmit one or more RF pulses towards Earth at an imaging target. Upon meeting the imaging target, the RF pulses may reflect off the surfaces creating an echo. While in orbit, the additional satellites may receive the echo to be consumed as SAR radar data.

At data downlink operation step 730, the satellites may employ a high-rate X-band transmitter fixed to the spacecraft body to efficiently downlink the large amount of data generated by the SAR payload. The transmitter on the satellite may have a highly directional gain pattern and may need to be commanded to downlink a specific dataset at a specific time to achieve efficiency. The downlinking of SAR radar data may be performed at one or more radar stations, mission control, or some other remote location on Earth.

The set of operations included and explained in environment 700 may be repeatable activities, but may not necessarily be exclusive to mission mode operations, and may or may not hinder other mission activities.

Figure 7B:
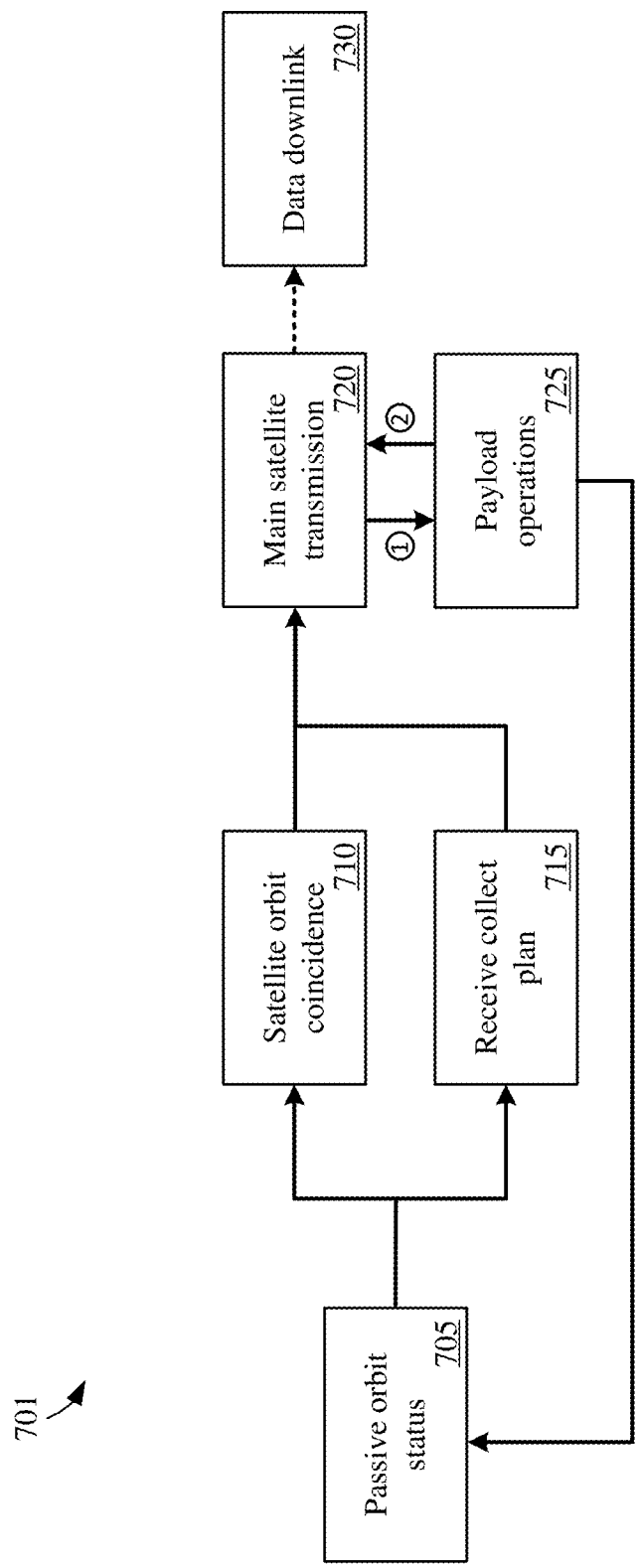

Similarly, FIG. 7B demonstrates another exemplary set of operations that may be performed by a satellite spacecraft in accordance with some embodiments of the present technology. FIG. 7B illustrates environment 701, which further includes passive operations step 705, satellite orbit step 710, reception step 715, transmission step 720, payload operations step 725, and data downlink operation step 730.

In environment 701, passive operations step 705, satellite orbit step 710, and reception step perform the same functions and activities as described in environment 700 shown in FIG. 7A. At transmission step 720, in accordance with various embodiments, a main satellite receives information from a radar station or mission control regarding satellite orbit coincidence, from satellite orbit step 710, and tasking requests and mission plans, from reception step 715. In transmission step 720, the main satellite firstly communicates the tasking requests and mission plans to each payload, or receiver satellite. In operation, while main satellite transmits RF pulses to capture radar data during transmission step 720, each additional satellite can coordinate and align to capture the radar data as part of payload operations step 725. As part of payload operations step 725 in environment 701, each additional satellite communicates all SAR data captured to main satellite. Main satellite can then either process the SAR data on-board or store the SAR data until data downlink operation step 730 is performed. At data downlink operation step 730, main satellite can transmit either processed or unprocessed SAR data downstream.

Figure 8:
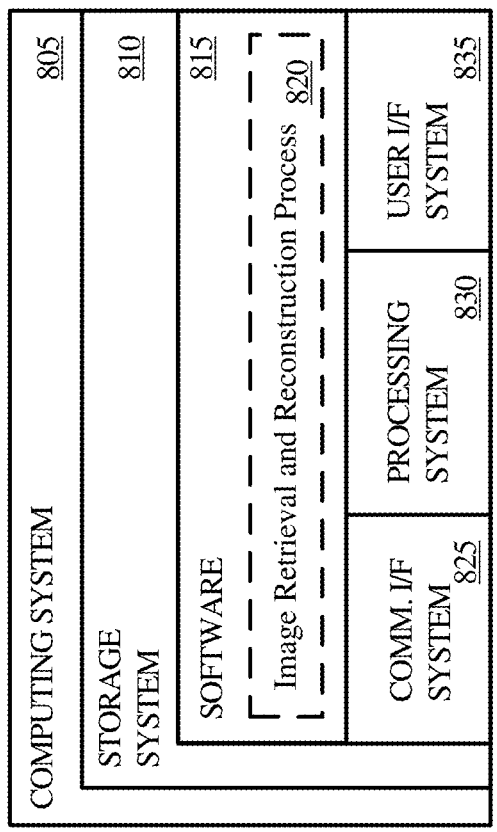
FIG. 8 illustrates an example of a computing system in accordance with some embodiments of the present technology.

FIG. 8 illustrates computing system 805 that is representative of any system or collection of systems in which the various processes, programs, services, and scenarios disclosed herein may be implemented. This computing system may be implemented in image processor 130 of FIG. 1B to facilitate radar data collection and image formation. Examples of computing system 805 include, but are not limited to, desktop computers, laptop computers, server computers, routers, web servers, cloud computing platforms, and data center equipment, as well as any other type of physical or virtual server machine, physical or virtual router, container, and any variation or combination thereof.

Computing system 805 may be implemented as a single apparatus, system, or device or may be implemented in a distributed manner as multiple apparatuses, systems, or devices. Computing system 805 includes, but is not limited to, storage system 810, processing system 830, software 815, communication interface system 825, and user interface system 835. Processing system 830 is operatively coupled with storage system 810, communication interface system 825, and user interface system 835.

Processing system 830 loads and executes software 815 from storage system 810. Software 815 includes and implements image retrieval and reconstruction process 820, which is representative of the SAR radar data and image formation and reconstruction processes discussed with respect to the preceding Figures. When executed by processing system 830 to provide image retrieval and image formation processes, software 815 directs processing system 830 to operate as described herein for at least the various processes, operational scenarios, and sequences discussed in the foregoing implementations. Computing system 805 may optionally include additional devices, features, or functionality not discussed for purposes of brevity.

Referring still to FIG. 8, processing system 830 may include a micro-processor and other circuitry that retrieves and executes software 815 from storage system 810. Processing system 830 may be implemented within a single processing device but may also be distributed across multiple processing devices or sub-systems that cooperate in executing program instructions. Examples of processing system 830 include general purpose central processing units, graphical processing units, application specific processors, and logic devices, as well as any other type of processing device, combinations, or variations thereof.

Storage system 810 may include any computer readable storage media readable by processing system 830 and capable of storing software 815. Storage system 810 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 810 may also include computer readable communication media over which at least some of software 815 may be communicated internally or externally. Storage system 810 may be implemented as a single storage device but may also be implemented across multiple storage devices or sub-systems co-located or distributed relative to each other. Storage system 810 may incorporate additional elements, such as a controller, capable of communicating with processing system 830 or possibly other systems.

Software 815 (including image retrieval and reconstruction process 820) may be implemented in program instructions and among other functions may, when executed by processing system 830, direct processing system 830 to operate as described with respect to the various operational scenarios, sequences, and processes illustrated herein. For example, software 815 may include program instructions for implementing image retrieval and reconstruction process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 815 may include additional processes, programs, or components, such as operating system software, virtualization software, or other application software. Software 815 may also include firmware or some other form of machine-readable processing instructions executable by processing system 830.

In general, software 815 may, when loaded into processing system 830 and executed, transform a suitable apparatus, system, or device (of which computing system 805 is representative) overall from a general-purpose computing system into a special-purpose computing system customized to provide image retrieval and reconstruction processes as described herein. Indeed, encoding software 815 on storage system 810 may transform the physical structure of storage system 810. The specific transformation of the physical structure may depend on various factors in different implementations of this description. Examples of such factors may include, but are not limited to, the technology used to implement the storage media of storage system 810 and whether the computer-storage media are characterized as primary or secondary storage, as well as other factors.

For example, if the computer readable storage media are implemented as semiconductor-based memory, software 815 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 825 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 805 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

Figure 9:
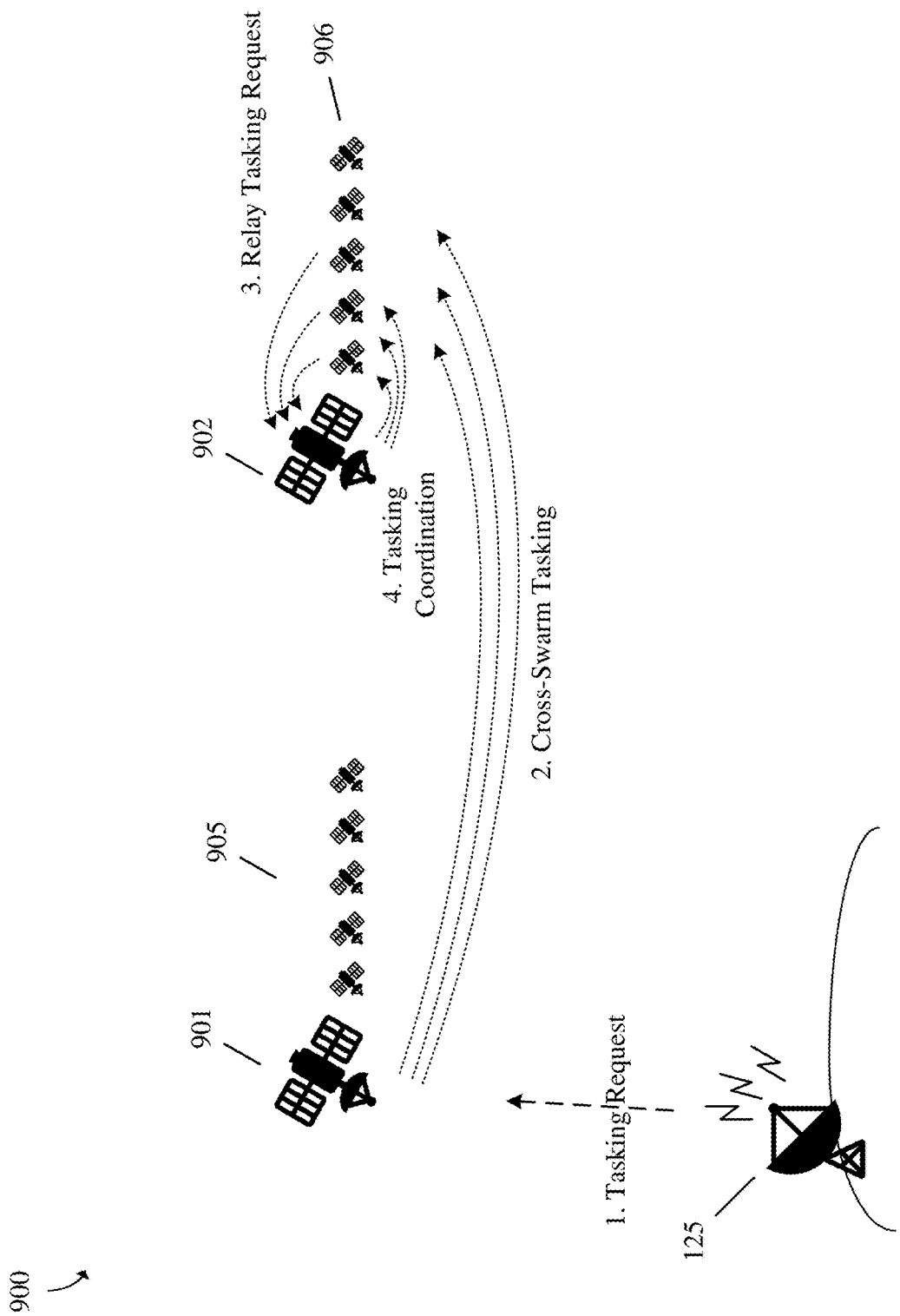
FIG. 9 illustrates an exemplary operating environment in which some embodiments of the present technology may be utilized.

FIG. 9 illustrates an exemplary operating environment in which some embodiments of the present technology may be utilized. In operating environment 900, as embodied in FIG. 9, a first cluster of satellites communicates with a second cluster of satellites to provide tasking information that may override an existing tasking request assigned to the second cluster of satellites. Operating environment 900 includes first satellite 901, first group of receiver-satellites 905, second satellite 902, second group of receiver-satellites 906, and radar station 125 (as shown in FIG. 1B).

In various embodiments, a first cluster of satellites, comprising first satellite 901 and first group of receiver-satellites 905, flies in low-Earth orbit and is configured to collect SAR data from one or more imaging targets on Earth. First satellite 901 has SAR technology on-board to transmit signals towards the one or more imaging targets, while each of the satellites in first group of receiver-satellites 905 comprises an antenna to receive echoes of the signals to generate SAR data. In order to accomplish the data capture, first satellite 901 receives a tasking request from radar station 125 over a communication link. The tasking request includes, for example, an optimal transmission position, a target velocity range, a location and/or coordinates of the one or more imaging targets, a target positioning range, relay constellation two-line element sets (TLEs), a refinery detector module definition, and the like. The positioning range should allow the satellites to configure into an approximate 5 kilometer radius of each other to allow for maximum data capture.

Either prior to or subsequently to capturing SAR data of one or more imaging targets, first satellite 901 can perform cross-cluster tasking to a trailing cluster of satellites, comprising second satellite 902 and second group of receiver-satellites 906. Using cross-cluster tasking communications allows a second cluster of satellites to receive a tasking request when out of range of radar station 125, for example. First satellite 901 may communicate, in the X-band frequency range, the tasking request to one or each of the satellites in second group of receiver-satellites 906. The cross-cluster tasking request can also include, in addition to any information transmitted from the radar station, updated positions, two-line element sets, and/or velocity estimates to be followed by the second cluster, and it may override any existing tasking request presented to the second cluster of satellites. In some embodiments, the cross-cluster tasking request communicated by first satellite 901 is transmitted using an on-board TLE graphics processing unit propagation technique.

Following the completion of cross-cluster communications, one or each of the satellites in second group of receiver-satellites 906 relays the tasking request to second satellite 902 for tasking override and coordination maneuvers. Second satellite 902 then communicates coordinate tasks for each of the satellites in second group of satellites 906 according to the tasking request. In some embodiments, the cross-cluster tasking routine can extend to a further cluster of satellites, wherein second satellite 902 may communicate with a third group of satellites, and so on.

Figure 10:
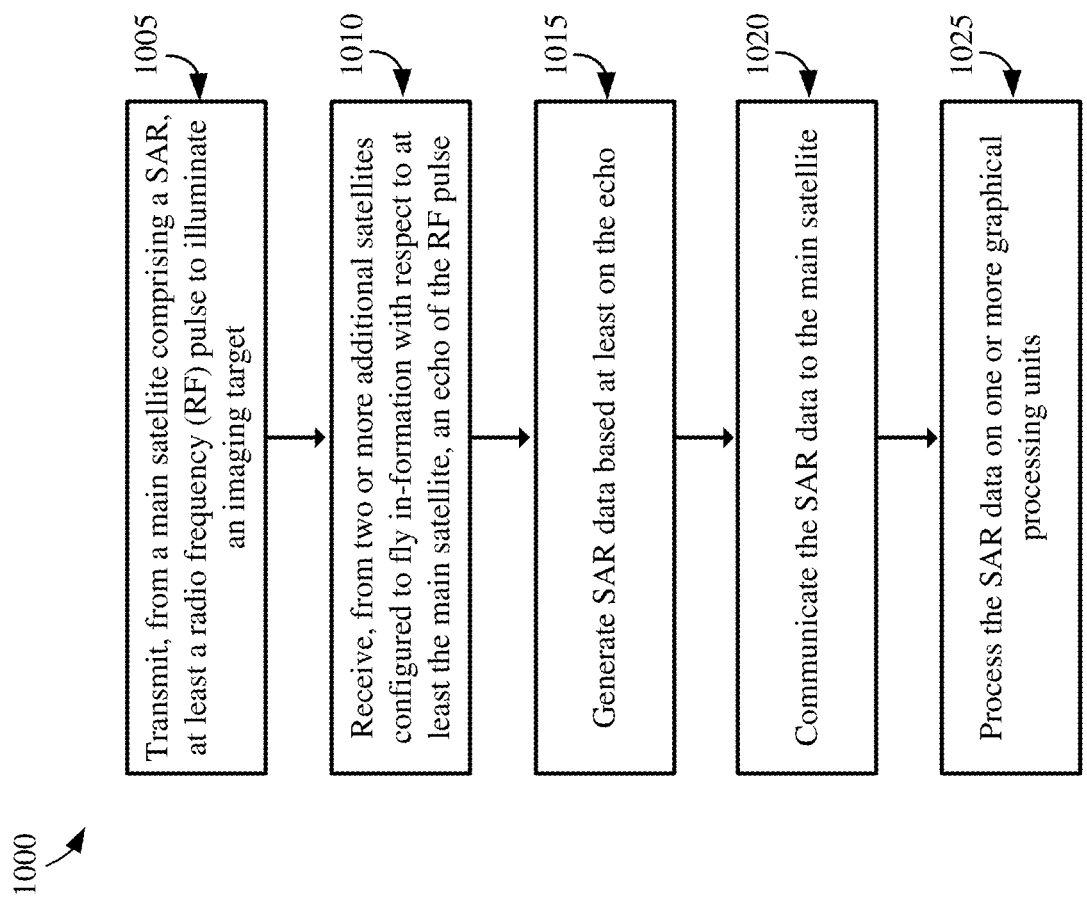
FIG. 10 is a flowchart illustrating a set of operations for radar-based image capturing and processing in accordance with some embodiments of the present technology.

FIG. 10 is a flowchart illustrating a set of operations for radar-based image capturing and processing in accordance with some embodiments of the present technology. In the set of operations illustrated in FIG. 10, a group of satellites captures radar data from an imaging target and processes the radar data on-board to generate images of the imaging target. FIG. 10 includes environment 1000, where environment further includes transmission step 1005, reception step 1010, generation step 1015, communication step 1020, and process step 1025.

First, in transmission step 1005, a main satellite comprising SAR technology, transmits radio frequency pulses to illuminate one or more imaging targets on Earth. In various embodiments, main satellite receives a tasking request which includes the location of the one or more imaging targets from a radar station or ground control station. In other embodiments, main satellite can have the tasking request stored in memory aboard the spacecraft. Main satellite can communicate the tasking request to other satellites flying in-formation in its orbit to ensure proper positioning and velocity. Once in a transmission zone, the main satellite's RF pulses reach the one or more imaging targets, and the pulse waves rebound off surfaces of the imaging target. Moving to reception step 1010, two or more additional satellites that are configured to fly in-formation with respect to the main satellite receive echoes of the RF pulses. Each of the additional satellites may have an antenna to capture the echoes. After receiving the echoes, the two or more additional satellites generate SAR data based at least on the echoes, as shown in generation step 1015.

Upon completion of generation step 1015, each of the additional satellites communicates the SAR data to the main satellite in communication step 1020. This communication may be performed in the X-band frequency range or some similar frequency range. Finally, at process step 1025, the main satellite processes the SAR data transmitted from each of the additional satellites on one or more graphical processing units on-board the spacecraft. In various embodiments, the GPUs process the SAR data to form images either in two-dimensional or three-dimensional format. Main satellite can then transmit the SAR images downstream or store them on-board on some computer-readable storage media.

Figure 11:
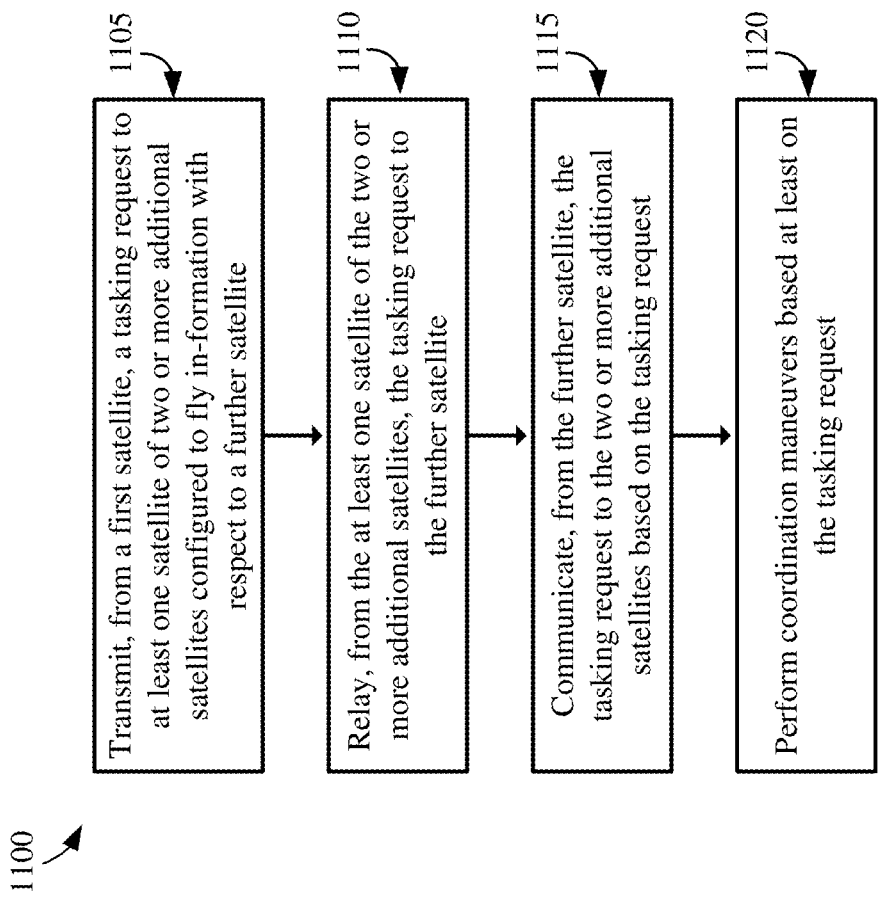
FIG. 11 is a flowchart illustrating a set of operations for cross-cluster tasking in accordance with some embodiments of the present technology.

FIG. 11 presents a flowchart illustrating a set of operations for cross-cluster tasking in accordance with some embodiments of the present technology. In the set of operations illustrated in FIG. 11, a first satellite or a lead satellite of a first cluster of satellites communicates a tasking request to a trailing cluster of satellites to enable mid-flight tasking updates. FIG. 11 includes environment 1100, which further includes cross-cluster transmission step 1105, relay step 1110, communication step 1115, and coordination step 1120.

Beginning with cross-cluster transmission step 1105, a first or leading satellite flies in low-Earth orbit ahead of another cluster of satellites. The first satellite, like first satellite 901 presented in FIG. 9, leads a first cluster of two or more receiver-satellites that are configured to fly in-formation with respect to the first satellite. In some embodiments, this first satellite may be programmed to function with specific tasking instructions utilized to capture SAR data from an imaging target. In other embodiments, the first satellite receives a tasking request or tasking instructions from a radar station located on Earth. The tasking instructions can indicate a trailing cluster of satellites and instruct the first satellite to transmit the tasking instructions to that trailing cluster of satellites. The trailing cluster of satellites, like the first cluster, comprises a second lead satellite and two or more receiver-satellites configured to fly in-formation with respect to the second lead satellite. Upon receiving the indication to communicate with the trailing cluster of satellites, first satellite transmits the tasking instructions or request to at least one of the two or more receiver-satellites. In some embodiments, the first satellite transmits said tasking instructions via an on-board two-line elements set GPU.

Next, in relay step 1110, the two or more receiver-satellites, or whichever of those satellites received the cross-cluster communication, in the trailing cluster of satellites relay the tasking instructions to the second lead satellite. The tasking instructions may comprise emergency override tasking, which further comprises updated position and velocity target ranges, updated detection algorithms, two-line element sets, coordinates for a targeted imaging area, and the like. Then, as shown in communication step 1115, the second lead satellite passes a tasking coordination message to all of the receiver-satellites in its cluster. Finally, in coordination step 1120, each satellite in the trailing cluster of satellites can perform coordination maneuvers based on the tasking coordination message. This entails re-positioning, among other maneuvers, to ensure maximum coverage of an imaging target upon a transmission to capture SAR data.

In some embodiments, the second cluster of satellites may be followed by a further cluster of satellites. In such embodiments, the steps illustrated in FIG. 11 can be repeated to relay and coordinate the further cluster accordingly. This provides an advantage of minimizing communication to Earth while also allowing a further pass over a target area to capture more radar data without waiting for a first cluster to make a repeat pass around Earth.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising." and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for." but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A method, comprising:
   receiving, from a radar station, a tasking request comprising a location of an imaging target, a target velocity range, and satellite positioning maneuvers based on the location and the target velocity range;
   transmitting, from a main satellite comprising a synthetic aperture radar, at least a radio frequency pulse to illuminate the imaging target;
   receiving, from two or more additional satellites configured to fly in-formation with respect to at least the main satellite, at least an echo of the radio frequency pulse, wherein each of the two or more additional satellites include an omnidirectional Telemetry, Tracking and Command (TTC) transponder;
   generating synthetic aperture radar image data based at least on the echo;
   communicating the synthetic aperture radar image data to the main satellite; and
   processing the synthetic aperture radar image data on one or more graphical processing units based at least on performing image formation, orthorectification, and synthetic aperture radar tomography.

2. The method of claim 1, further comprising:
   communicating, from the main satellite to the two or more additional satellites, the tasking request;
   wherein the tasking request further comprises a transmission duration corresponding to the radio frequency pulse;
   wherein each of the two or more additional satellites includes an antenna; and
   positioning, based on the tasking request, each of the two or more additional satellites via a satellite positioning maneuver of the satellite positioning maneuvers such that the antenna of a respective satellite aims towards the imaging target for the transmission duration.

3. The method of claim 1, wherein the two or more additional satellites are further configured to fly in low-Earth orbit and communicate with the main satellite in the X-band frequency range or the S-band frequency range.

4. The method of claim 1, wherein processing the synthetic aperture radar image data is further based on performing geo-location and interferometry.

5. The method of claim 1, wherein the one or more graphical processing units are located on-board the main satellite, and wherein the one or more graphical processing units are configured to produce at least one among two-dimensional and three-dimensional images based at least on the synthetic aperture radar image data.

6. The method of claim 1, wherein the two or more additional satellites consist of four, five, or six additional satellites.

7. The method of claim 1, wherein the two or more additional satellites configured to fly in-formation with respect to at least the main satellite are configured to fly within a spherical radius between five and ten kilometers of each other.

8. A computing apparatus, comprising:
   one or more computer-readable storage media;
   a processing system operatively coupled with the one or more computer-readable storage media; and
   program instructions stored on the one or more computer-readable storage media that, based on being read and executed by the processing system, direct the computing apparatus to at least:
   receive, from a radar station, a tasking request comprising a location of an imaging target, a target velocity range, and satellite positioning maneuvers based on the location and the target velocity range;
   transmit, from a main satellite comprising a synthetic-aperture radar, at least a radio frequency pulse to illuminate the imaging target;
   receive, by two or more satellites configured to fly in-formation with respect to at least the main satellite, at least an echo of the radio frequency pulse wherein each of the two or more additional satellites include an omnidirectional Telemetry, Tracking and Command (TTC) transponder;
   generate synthetic aperture radar image data based at least on the echo;
   communicate the synthetic aperture radar image data to the main satellite; and
   process the synthetic aperture radar image data on one or more graphical processing units based at least on performing image formation, orthorectification, and synthetic aperture radar tomography.

9. The computing apparatus of claim 8, wherein the program instructions further direct the computing apparatus to:
   communicate, from the main satellite to the two or more additional satellites, the tasking request;
   wherein the tasking request further comprises a transmission duration corresponding to the radio frequency pulse;
   wherein each of the two or more additional satellites includes an antenna; and
   position, based on the tasking request, each of the two or more additional satellites via a satellite positioning maneuver such that the antenna of a respective satellite aims towards the imaging target for the transmission duration.

10. The computing apparatus of claim 8, wherein the two or more additional satellites are further configured to fly in low-Earth orbit and communicate with the main satellite in the X-band frequency range or the S-band frequency range.

11. The computing apparatus of claim 8, wherein to process the synthetic aperture radar image data, the program instructions direct the computing apparatus to process the synthetic aperture data on the one or more graphical processing units based further on performing geo-location and interferometry.

12. The computing apparatus of claim 8, wherein the one or more graphical processing units are located on-board the main satellite, and wherein the one or more graphical processing units are configured to produce at least one among two-dimensional and three-dimensional images based at least on the synthetic aperture radar image data.

13. The computing apparatus of claim 8, wherein the two or more additional satellites consist of four, five, or six additional satellites.

14. The computing apparatus of claim 8, wherein the two or more additional satellites configured to fly in-formation with respect to at least the main satellite are configured to fly within a spherical radius between five and ten kilometers of each other.

15. A computing apparatus, comprising:
  one or more computer-readable storage media;
  a processing system operatively coupled with the one or more computer-readable storage media; and
  program instructions stored on the one or more computer-readable storage media that, based on being read and executed by the processing system, direct the computing apparatus to at least:
    transmit, from a first satellite of a first subset of synthetic aperture radar satellites including two or more additional satellites each having an omnidirectional Telemetry, Tracking and Command (TTC) transponder and configured configured to fly in-formation with the first satellite, a tasking request to at least one satellite of a second subset of synthetic aperture radar satellites including a further satellite and two or more further satellites configured to fly in-formation with respect to the further satellite, wherein the tasking request comprises a location of an imaging target, a target velocity range, and satellite positioning maneuvers based on the location and the target velocity range;
    relay, from the at least one satellite of the second subset of synthetic aperture radar satellites, the tasking request to the further satellite;
    communicate, from the further satellite, the tasking request to each satellite of the two or more further satellites of the second subset of synthetic aperture radar satellites; and
    perform the satellite positioning maneuvers based at least on the tasking request.

16. The computing apparatus of claim 15, wherein the program instructions further direct the computing apparatus to capture synthetic aperture radar data from an imaging target.

17. The computing apparatus of claim 15, wherein the tasking request further comprises a constellation two-line element set, a transmission duration, and a positioning range.

18. The computing apparatus of claim 15, wherein to transmit the tasking request to the at least one satellite of the two or more further satellites, the program instructions further direct the computing apparatus to propagate the tasking request using an on-board graphics processing unit.

19. The computing apparatus of claim 15, wherein to transmit the tasking request to two or more further satellites, the program instructions further direct the computing apparatus to communicate in the X-band frequency range.

20. The computing apparatus of claim 15, wherein the two or more additional satellites and the two or more further satellites are further configured to fly in low-Earth orbit, wherein the two or more additional satellites consist of four, five, or six additional satellites, and wherein the two or more further satellites consist of four, five, or six additional satellites.

* * * * *